(12) United States Patent
Hur (10) Patent No.: US 11,110,354 B2
(45) Date of Patent: Sep. 7, 2021

(54) METHOD FOR PROVIDING BATTLE ROYALE GAME USING SUPPLY BOX AND SERVER USING SAME

(71) Applicant: Wonder People Co., Ltd., Seoul (KR)

(72) Inventor: Min Hur, Seoul (KR)

(73) Assignee: WONDER PEOPLE CO. LTD., Seoul (KR)

(*) Notice: Subject to any disclaimer, the term of this patent is extended or adjusted under 35 U.S.C. 154(b) by 0 days.

(21) Appl. No.: 16/999,101

(22) Filed: Aug. 21, 2020

(65) Prior Publication Data

US 2020/0376386 A1 Dec. 3, 2020

Related U.S. Application Data

(63) Continuation of application No. PCT/KR2019/002046, filed on Feb. 20, 2019.

(51) Int. Cl.
*A63F 13/69* (2014.01)
*A63F 13/45* (2014.01)
*A63F 13/822* (2014.01)

(52) U.S. Cl.
CPC .............. *A63F 13/69* (2014.09); *A63F 13/45* (2014.09); *A63F 13/822* (2014.09); *A63F 2300/609* (2013.01); *A63F 2300/807* (2013.01)

(58) Field of Classification Search
CPC ........ A63F 13/69; A63F 13/45; A63F 13/822; A63F 2300/609; A63F 2300/807
See application file for complete search history.

(56) References Cited

U.S. PATENT DOCUMENTS

2016/0175715 A1* 6/2016 Ye ........................... A63F 13/58
715/757
2018/0093187 A1* 4/2018 Mabuchi ............... A63F 13/216

OTHER PUBLICATIONS

International Search Report and Written Opinion dated Jun. 5, 2019 for PCT/KR2019/002046 filed on Feb. 20, 2019, 10 pages including English Translation of the International Search Report.

(Continued)

*Primary Examiner* — Kang Hu
*Assistant Examiner* — Thomas H Henry
(74) *Attorney, Agent, or Firm* — Xsensus LLP (57) ABSTRACT

The present invention provides a method for providing a battle royale game using a supply box, the method comprising the steps of: (a) allowing a particular player to select a particular item owned by the particular player or allowing the particular item to be selected through a predetermined first algorithm in a first state by a game server; (b) when information relating to the particular item is acquired, generating a particular supply box including the particular item and corresponding to the particular player, and determining location information relating to a location on a map, at which the generated particular supply box is input when the game enters a second state later, by the game server; and (c) when the game has entered the second state, placing the particular supply box with reference to the location information and supporting the particular player to play the battle royale game by using the placed particular supply box by the game server.

20 Claims, 4 Drawing Sheets

(56) References Cited

OTHER PUBLICATIONS

"[Action] Infinite Strike Action Zombie Knight for KAKAO," Jul. 31, 2019, Retrieved from the Internet URL: https://blog.naver.com/na_uin/10173457137, on May 10, 2018, pp. 1-5 (with English Translation).

"[H1Z1] H1Z1 Airdrop Ticket [Airdrop]," How to use Airdrop Ticket, Jul. 5, 2016, Retrieved from the Internet URL: https://blog.naver.com/steamkyu/220754312157, on May 10, 2018, pp. 1-3 (with English Translation).

* cited by examiner

FIG. 4

METHOD FOR PROVIDING BATTLE ROYALE GAME USING SUPPLY BOX AND SERVER USING SAME

CROSS-REFERENCE TO RELATED APPLICATIONS

The present application is a bypass continuation of PCT filing PCT/KR2019/002046, filed Feb. 20, 2019, which claims priority to KR 10-2018-0020805, filed Feb. 21, 2018, the entire contents of each are incorporated herein by reference.

FIELD OF THE DISCLOSURE

The present disclosure relates to a method for providing a battle royale game in which supply boxes are provided and a server using the same; and more particularly, to the method for providing the battle royale game where a plurality of game players compete for survival in a specific area, where a first state of the battle royale game represents a state in which the game players log into the battle royale game but do not play the battle royale game and where a second state of the battle royale represents a state in which the game players play the battle royale game, comprising steps of: (a) a game server performing one of (i) a process of allowing a specific player in the first state among the game players to select at least one first in-box item among (1) one or more personal items owned by the specific player and (2) one or more shared items, and (ii) a process of allowing the first in-box item to be selected by using a first algorithm; (b) if information on the first in-box item is acquired, the game server performing a process of generating a specific supply box, corresponding to the specific player, which includes the first in-box item and, and a process of determining information on a specific location of the specific supply box which is going to be provided on a specific map after the specific player enters the second state; and (c) if the specific player enters the second state, the game server performing a process of providing the specific supply box by referring to the information on the specific location, and a process of allowing the specific player to use the specific supply box provided on the specific map during the second state.

BACKGROUND OF THE DISCLOSURE

Recently, a lot of battle royale games in which a large number of game players can play at the same time have been released, and the battle royale games are growing rapidly as they are steadily gaining popularity among users. In particular, a battle royale game such as PlayerUnknown's Battlegrounds is steadily gaining popularity.

The battle royale game is basically a game in which a large number of the game players compete with one another in a limited space to determine the final winner. And its continued popularity among the game players are attributed to pleasure in seizing a given terrain and items and establishing a strategy to overwhelm other game players.

However, rather than simply acquiring a supply box containing a given item (referred to as 'farming'), obtaining the supply box containing the item selected directly by the game players will be of greater interest to the game players when establishing a strategy for playing the battle royale game.

Accordingly, the inventor of the present disclosure proposes a method for providing an advanced battle royale game and a server using the same.

SUMMARY OF THE DISCLOSURE

It is an object of the present disclosure to solve all the aforementioned problems.

It is another object of the present disclosure to allow a game player to select an item for use in a battle royale game and to generate a supply box containing the selected item therein.

It is still another object of the present disclosure to allow the game player to probabilistically determine where the supply box is going to be provided on a map.

In order to accomplish objects above and characteristic effects to be described later of the present disclosure, distinctive configurations of the present disclosure are described as follows.

In accordance with one aspect of the present disclosure, there is provided a method for providing a battle royale game in which supply boxes are provided, wherein the battle royale game is a game in which a plurality of game players compete for survival in a specific area, wherein a first state of the battle royale game represents a state in which the game players log into the battle royale game but do not play the battle royale game and wherein a second state of the battle royale game represents a state in which the game players play the battle royale game, including steps of: (a) a game server performing one of (i) a process of allowing a specific player in the first state among the game players to select at least one first in-box item among (1) one or more personal items owned by the specific player and (2) one or more shared items, and (ii) a process of allowing the first in-box item to be selected by using a first algorithm; (b) if information on the first in-box item is acquired, the game server performing a process of generating a specific supply box, corresponding to the specific player, which includes the first in-box item and, and a process of determining information on a specific location of the specific supply box which is going to be provided on a specific map after the specific player enters the second state; and (c) if the specific player enters the second state, the game server performing a process of providing the specific supply box by referring to the information on the specific location, and a process of allowing the specific player to use the specific supply box provided on the specific map during the second state.

In accordance with another aspect of the present disclosure, there is provided a game server for providing a battle royale game in which supply boxes are provided, wherein the battle royale game is a game in which a plurality of game players compete for survival in a specific area, wherein a first state of the battle royale game represents a state in which the game players log into the battle royale game but do not play the battle royale game and wherein a second state of the battle royale game represents a state in which the game players play the battle royale game, including: a communication part; and a processor for performing (I) one of (i) a process of allowing a specific player in the first state among the game players to select at least one first in-box item among (1) one or more personal items owned by the specific player and (2) one or more shared items, and (ii) a process of allowing the first in-box item to be selected by using a first algorithm, (II) if information on the first in-box item is acquired, a process of generating a specific supply box, corresponding to the specific player, which includes the first in-box item and, and a process of determining information on a specific location of the specific supply box which is going to be provided on a specific map after the specific player enters the second state, and (III) if the specific player enters the second state, a process of providing the specific supply box by referring to the information on the specific location, and a process of allowing the specific player to use the specific supply box provided on the specific map during the second state.

DETAILED DESCRIPTION OF THE PREFERRED EMBODIMENTS

In the following detailed description, reference is made to the accompanying drawings that show, by way of illustration, specific embodiments in which the disclosure may be practiced. These embodiments are described in sufficient detail to enable those skilled in the art to practice the disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar components throughout the several aspects.

To allow those skilled in the art to the present disclosure to be carried out easily, the example embodiments of the present disclosure by referring to attached diagrams will be explained in detail as shown below.

Figure 1:
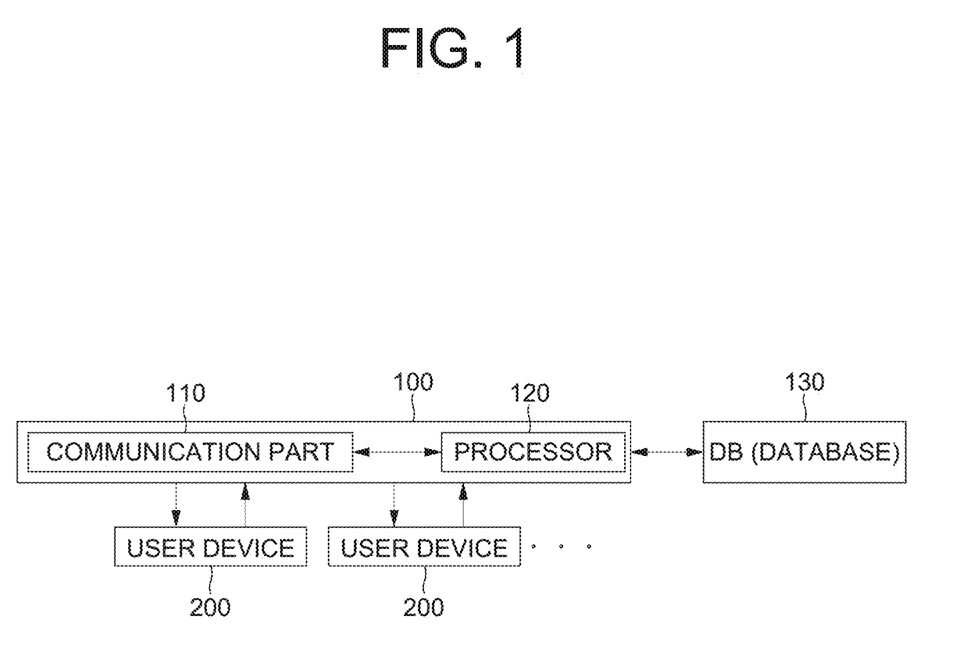
FIG. 1 is a drawing schematically illustrating a configuration of a game server in accordance with one example embodiment of the present disclosure.

FIG. 1 is a drawing schematically illustrating a configuration of a game server 100 in accordance with one example embodiment of the present disclosure.

As illustrated in FIG. 1, the game server 100 of the present disclosure may include a communication part 110 and a processor 120. And as another example different from FIG. 1, the game server 100 may include a database 130 as the case may be. In addition, the communication part 110 may communicate with at least one user device 200.

First, the communication part 110 of the game server 100 may be implemented by various communication technologies. That is, WIFI, WCDMA (Wideband CDMA), HSDPA (High Speed Downlink Packet Access), HSUPA (High Speed Uplink Packet Access), HSPA (High Speed Packet Access), Mobile WiMAX, WiBro, LTE (Long Term Evolution), Bluetooth, IrDA (Infrared Data Association), NFC (Near Field Communication), Zigbee or wireless LAN may be used. Further, if a service is provided over the Internet, then TCP/IP, which is a set of standard protocols for transmission of information on the Internet, may be adopted.

Next, the database 130 may be accessible by the communication part 110 of the game server 100. And the processor 120 of the game server 100 may allow a specific player among game players to select at least one specific item and thus to play a battle royale game using the selected specific item. This will be described in detail by referring to description later.

Meanwhile, the user device 200 in accordance with one example embodiment of the present disclosure may be a digital device capable of connecting and communicating with the game server 100. And the user device 200 may include any digital device with a processor capable of computation and having a memory, such as a desktop computer, a notebook computer, a workstation, a PDA, a web pad, a mobile phone, etc. Especially, the user device 200 may include a battle royale game related program.

The battle royale game is a game programmed to allow a plurality of the game players to compete for survival in a specific area. The game players must eliminate all other opponents, with the winner being the last player or team alive. Also, the battle royale game may be programmed to be over when a quest is determined as completed by the specific player.

Meanwhile, a first state of the battle royale game may represent a state in which the specific player logs in but does not play the battle royale game, and a second state of the battle royale game may represent a state in which the specific player plays the battle royale game.

That is, the first state may represent the state in which the specific player logs into the battle royale game by inputting an ID and a password but does not proceed with the battle royale game yet, and the second state may represent the state in which the specific player plays the battle royale game using his/her own specific avatar.

Figure 2:
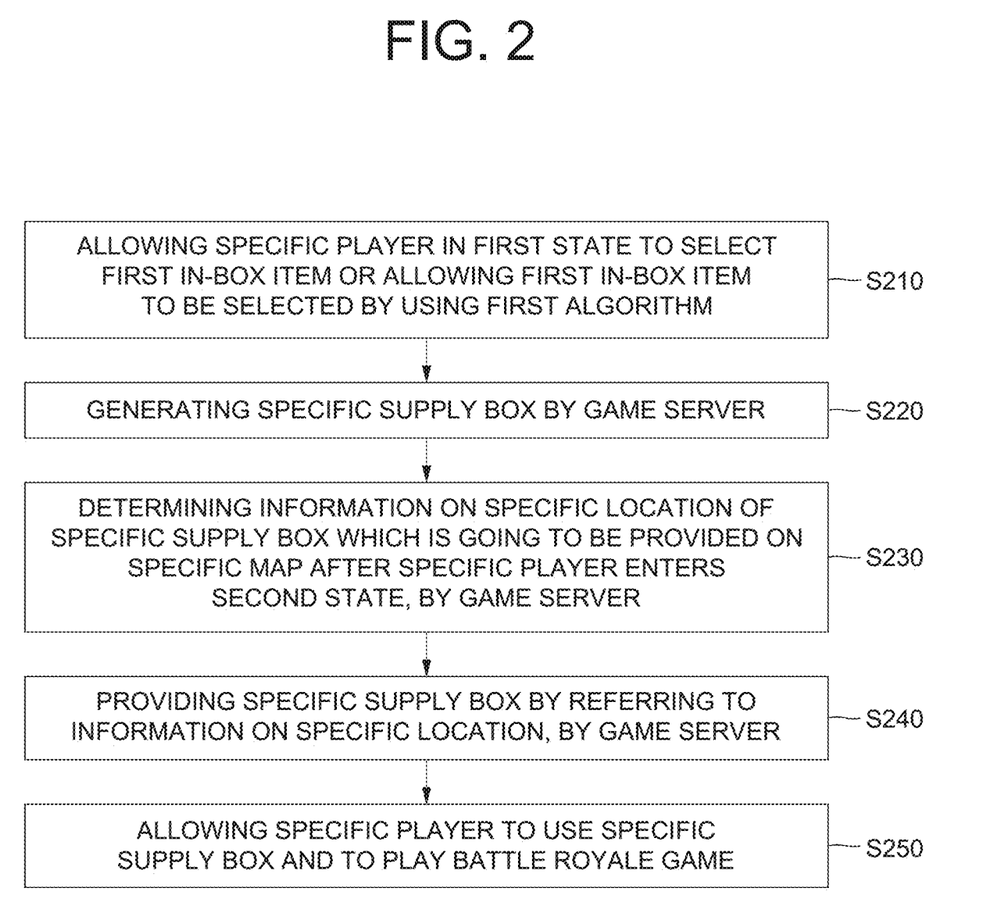
FIG. 2 is a drawing schematically illustrating processes of allowing a specific player to use a specific supply box when playing a battle royale game in accordance with one example embodiment of the present disclosure.

FIG. 2 is a drawing schematically illustrating processes of allowing a specific player to use a specific supply box when playing the battle royale game in accordance with one example embodiment of the present disclosure.

The processor 120 of the game server 100 may perform one of (i) a process of allowing the specific player in the first state to select at least one first in-box item among (1) one or more personal items owned by the specific player and (2) one or more shared items, and (ii) a process of allowing the first in-box item to be selected by using a first algorithm, at a step of S210.

The personal items owned by the specific player may include at least one of (i) an item acquired by the specific player using in-game currency, (ii) an item acquired by the specific player in the second state, and (iii) an item acquired as reward for completing the quest in the battle royale game by the specific player.

That is, the game server 100 may allow the specific player to directly purchase or acquire the items. Herein, the items stored in a personal item storage, etc. may be referred to as the personal items.

The shared items may be basic items with which the game server 100 provides the game players by default.

Also, items such as the personal items and the shared items used in the battle royale game may include combat uniforms, medicine, weapons such as guns, knives, ammunition, etc. The items used in the battle royale game may further include various objects such as motorcycles, parachutes, drones, communication devices, etc.

The processor 120 of the game server 100 may allow the specific player to select the first in-box item (e.g., an M4 carbine, a knife, a bulletproof vest, etc.) among (1) his/her own items (e.g., the personal items) and (2) the basic items (e.g., the shared items). Or as another example, the processor 120 may select the first in-box item using the first algorithm and accordingly provide the specific player with the first in-box item. Herein, the first algorithm may be implemented by a randomization algorithm or may be implemented by other algorithms.

If information on the first in-box item is acquired, the processor 120 of the game server 100 may perform a process of generating a specific supply box, corresponding to the specific player, which contains the first in-box item therein, at a step of S220.

Also, the processor 120 of the game server 100 may perform a process of determining information on a specific location of the specific supply box which is going to be provided on a specific map after the specific player enters the second state, at a step of S230. This will be described by referring to FIG. 3.

Figure 3:
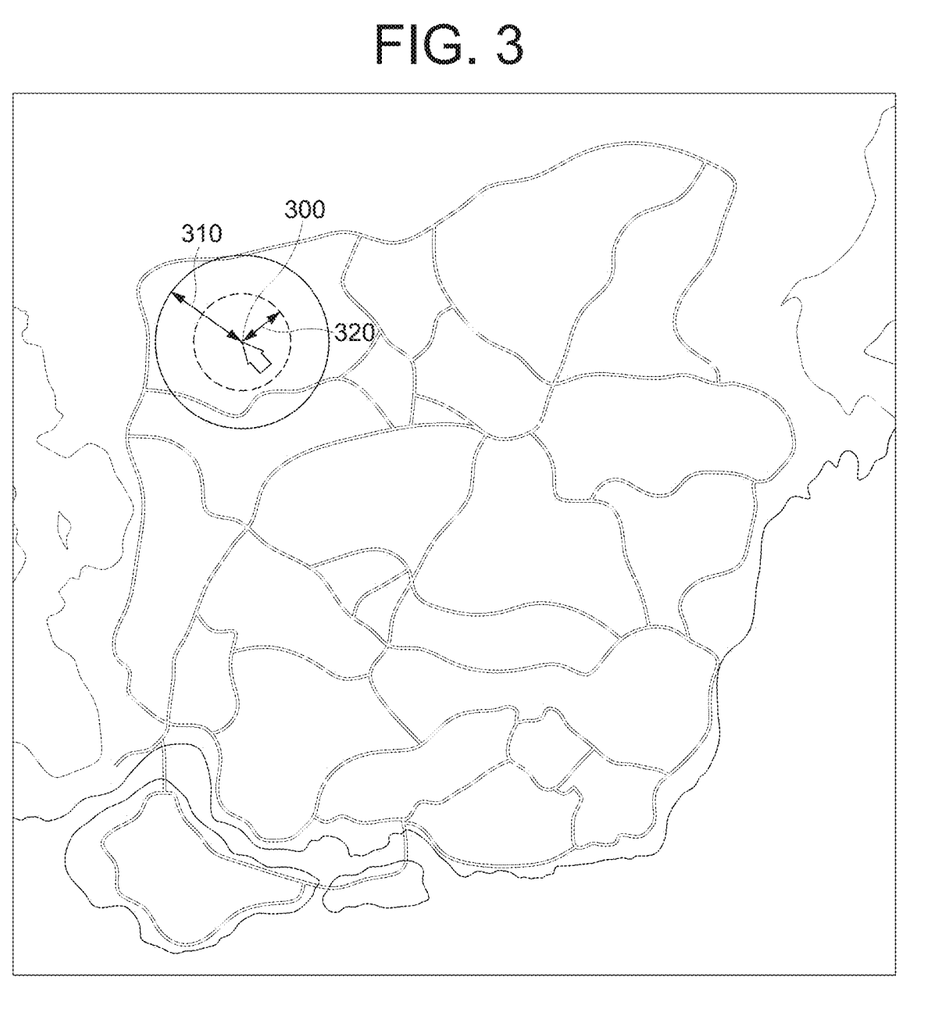
FIG. 3 is a drawing schematically illustrating an example of a specific map provided to allow the specific player to determine a location where the specific supply box is going to be provided in accordance with one example embodiment of the present disclosure.

FIG. 3 is a drawing schematically illustrating an example of the specific map provided to allow the specific player to determine the specific location where the specific supply box is going to be provided in accordance with one example embodiment of the present disclosure.

First, the processor 120 of the game server 100 may acquire metadata on a designated position 300 on the specific area from the specific player through the communication part 110. For reference, the designated position 300 may be a position, on the specific map, designated by the specific player where the specific player wants the specific supply box to be provided. Next, the processor 120 of the game server 100 may perform a process of determining the information on the specific location as specific coordinates which may represent one of (1) first coordinates corresponding to the designated position 300 and (2) second coordinates, within a specific distance 310 or 320 from the designated position 300, determined using a second algorithm, acquired by referring to the metadata. The specific distance may be identified as a first distance 310 or a second distance 320 according to their lengths, which will be described later.

For reference, said first coordinates corresponding to the designated position 300 may be coordinates of a location represented by a reference sign 300 of FIG. 3. And said second coordinates may be coordinates within the specific distance 310 or 320 from the designated position 300, determined using the second algorithm. Herein, the second algorithm may be implemented by a randomization algorithm or may be implemented by other algorithms.

That is, the processor 120 of the game server 100 may determine a location where the specific supply box is going to be provided as the internal area of the circle whose center lies on a location designated by the specific user. Herein, the circle may have a radius of the specific distance 310 or 320. As another example, unlike the drawings, the circle may be in another shape as the case may be.

Meanwhile, the processor 120 of the game server 100 may perform a process of assigning a probability of the specific supply box being provided to a location farther from the designated position 300 to be higher. The purpose of this is to allow more of variables to be introduced en route to the specific supply box by assigning a probability of the specific supply box being provided to a location farther from the designated position to be higher.

Also, the processor 120 of the game server 100 may perform a process of allowing the specific player to adjust the specific distance 310 or 320 if the processor 120 detects at least one of (i) a case where the specific player uses the in-game currency, (ii) a case where the specific player uses a distance-adjusting item, and (iii) a case where the specific player completes the quest in the battle royale game.

By referring to FIG. 3, for example, the processor 120 of the game server 100 may set the specific supply box to be provided within the internal area of a circle with a radius of the first distance 310 by default. As another example, if the game server 100 detects that the specific player pays the in-game currency or uses the distance-adjusting item, etc., then the processor 120 may set the specific supply box to be provided within the internal area of a circle with a radius of the second distance 320.

That is, the specific player may estimate more precisely a location where his/her own specific supply box is going to be provided by, for example, paying the in-game currency.

Meanwhile, as another example, the processor 120 of the game server 100 may perform a process of determining the information on the specific location such that a probability of the specific supply box being provided is assigned as a lower one to a center area of the safe area than to an outside of the center area of the safe area.

The game may be programmed to allow the safe area to be protected from a damaging mechanism. In detail, when a specific avatar of the specific player is detected as being positioned outside the safe area, the game may be programmed to allow the specific avatar to receive continuous damage. As another example, the specific avatar may be programmed to be immediately eliminated once detected as being positioned outside the safe area. Also, a shape of the safe area may be programmed to vary as the case may be.

Even within the safe area, the processor 120 may perform a process of assigning a probability of the specific supply box being provided as a higher one to a location farther from the center area of the safe area. Further, the processor 120 may perform a process of assigning a probability of the specific supply box being provided as a higher one to a location outside the safe area than within the safe area.

Meanwhile, if the specific player is detected as having entered the second state, the processor 120 of the game server 100 may perform a process of providing the specific supply box by referring to the information on the specific location, at a step of S240, and a process of allowing the specific player to use the specific supply box provided on the specific map during the second state, at a step of S250.

Figure 4:
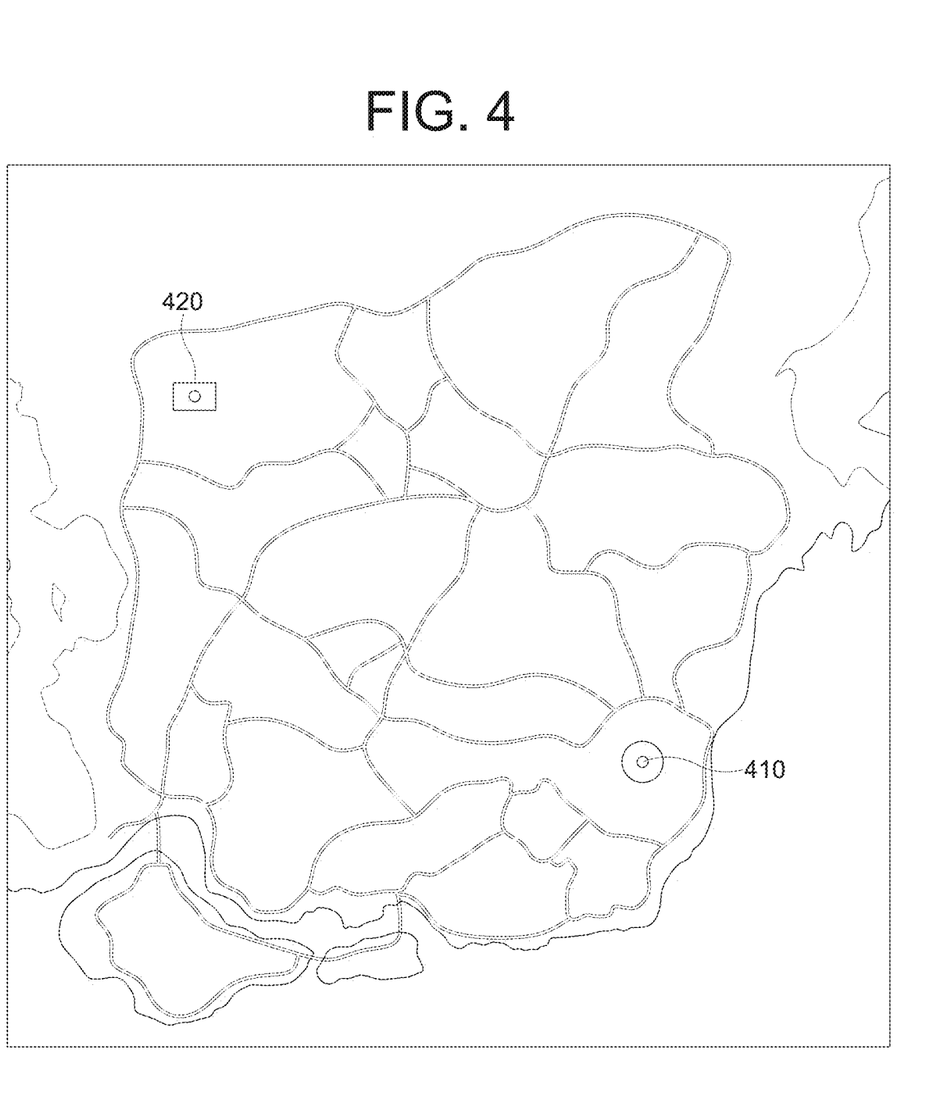
FIG. 4 is a drawing schematically illustrating an example of the specific map on which location information on the specific supply box and location information on a specific avatar of the specific player are indicated in accordance with one example embodiment of the present disclosure.

FIG. 4 is a drawing schematically illustrating an example of the specific map on which (1) location information 410 on the specific avatar and (2) location information 420 on the specific supply box are indicated in accordance with one example embodiment of the present disclosure.

Specifically, the game may be programmed to allow the specific player to find the specific supply box and thus to acquire a first in-box item included in the specific supply box by referring to (1) the location information 410 on the specific avatar and (2) the location information 420 on the specific supply box, displayed on the specific map.

Meanwhile, the game players may include a first player and a second player, a first supply box may correspond to the first player, and a second supply box may correspond to the second player.

Herein, the processor 120 of the game server 100 may allow the first player in the second state to visually perceive (or not to visually perceive) the second supply box of his/her opponent in the specific area. And similarly, the processor 120 of the game server 100 may allow the second player in the second state to visually perceive (or not to visually perceive) the first supply box of his/her opponent in the specific area. Herein, such configuration may be varied according to a preset condition.

Also, as another example, the processor 120 of the game server 100 may perform (i) a process of providing the first player with a first map including information on a first location where the first supply box is provided, and (ii) a process of providing the second player with a second map including information on a second location where the second supply box is provided. That is, the processor 120 may allow each of the game players to be provided with location information on his/her own supply boxes only through his/her own map. However, as another example, the processor 120 may not allow each of the game players to be provided with location information on the supply boxes of other game players through his/her own map. As still another example, the processor 120 may allow the specific player to be provided with the location information on the supply boxes of said other game players through his/her own map if the processor 120 detects that a certain item, etc. is used, as the case may be. Similarly, whether the location information on the supply boxes of said other game players may be visually identified (or not be visually identified) by a first avatar of the first player through use of the first map may be varied according to a predetermined condition.

Meanwhile, if the first avatar is detected as having eliminated, e.g., having killed, a second avatar of the second player or if the first avatar is detected as having acquired a map storage, i.e., a virtual device in which a map is stored, owned by the second avatar, then the processor 120 of the game server 100 may perform a process of providing the first player with the first map on which the information on the second location is further indicated.

That is, if the first avatar is detected as having eliminated the second avatar or if the first avatar is detected as having acquired the map storage of the second avatar, then the game server 100 may allow the specific map provided for the first player to display the information on the first location and the information on the second location.

Also, if the first avatar is detected as having destroyed the second supply box, the processor 120 of the game server 100 may perform one of (i) a process of destroying a second in-box item included in the second supply box such that none of the game players are allowed to acquire the second in-box item, and (ii) a process of allowing the first player to acquire the second in-box item.

Specifically, in a case of said (i), if the first avatar is detected as having destroyed the second supply box, then the second in-box item in the second supply box may also be programmed to be destroyed.

Also, in a case of said (ii), only the second supply box may be programmed to be destroyed but the second in-box item therein may be programmed to be intact and acquired by the first player. Herein, the intact second in-box item may be programmed to be without any damage or partly damaged, according to a predefined condition.

Meanwhile, the processor 120 of the game server 100 may perform a process of allowing the specific player in the second state to acquire the first in-box item by opening the specific supply box.

In detail, according to a programmed game scenario, only a certain player may be allowed to have a key, e.g., a virtual fingerprint of his/her own avatar, to unlock and open his/her supply box and thus to acquire his/her first in-box item. That is, the processor 120 may allow the specific player to destroy the supply boxes of said other game players, but may not allow the specific player to open the supply boxes of said other game players.

Also, if the specific player is detected as failing to open the specific supply box even after a specific time from entering the second state, the processor 120 of the game server 100 may perform one of (i) a process of degrading a degree of durability assigned to the specific supply box by a certain amount and (ii) a process of degrading a degree of performance assigned to the first in-box item by a particular amount.

The purpose of this is to prevent the specific player from ambushing near the supply boxes of said other game players without trying to find his/her own specific supply box.

For reference, the specific time, the certain amount by which the degree of the durability degrades, and the particular amount by which the degree of the performance degrades, etc. may be programmed to vary according to the configuration.

Meanwhile, the processor 120 of the game server 100 may perform a process of assigning a probability of said other game players being capable of finding the specific supply box by referring to information on a degree of occlusion assigned to the specific supply box.

For example, assuming that the degree of the occlusion is divided into a first grade and a second grade, in a case of the first grade, said other game players may easily find the specific supply box on a road for example, and in a case of the second grade, said other game players may not easily find the specific supply box since the specific supply box may be programmed to be hidden in the bushes or under the ground.

Also, the processor 120 of the game server 100 may perform a process of allowing the specific player to adjust the degree of the occlusion if the processor 120 detects at least one of (i) a case where the specific player uses the in-game currency, (ii) a case where the specific player uses an occlusion-adjusting item, and (iii) a case where the specific player completes the quest in the battle royale game.

That is, if the specific player wants a higher degree of the occlusion to prevent said other game players from easily finding and destroying his/her specific supply box, the processor 120 of the game server 100 may allow the specific player to use the in-game currency etc. to prevent the specific supply box from being easily found.

The present disclosure has an effect of allowing the game players to select an item for use in the battle royale game and generate a customized supply box containing the item therein.

The present disclosure has another effect of allowing the game players to probabilistically determine information on where the supply box is going to be provided on a map.

The embodiments of the present disclosure as explained above can be implemented in a form of executable program command through a variety of computer means recordable in computer readable media. The computer readable media may include solely or in combination, program commands, data files, and data structures. The program commands recorded in the media may be components specially designed for the present disclosure or may be usable to those skilled in the art in a field of computer software. Computer readable media may include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which may be executable by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for providing a battle royale game in which supply boxes are provided, wherein the battle royale game is a game in which a plurality of game players compete for survival in a game map, a first state of the battle royale game being a state in which the game players log into the battle royale game but do not play the battle royale game and a second state of the battle royale game being a state in which the game players play the battle royale game, the method comprising:

providing, by a game server when the battle royale is in the first state, a specific player of the plurality of game players with an option to select an in-box item and to provide metadata of a designated position within a game map;

performing, by the game server, the first process when the game server receives a selection from the specific user, the selection indicating at least one first in-box item among (1) one or more personal items owned by the specific player and (2) one or more shared items; or performing, by the game server when the game server does not receive the selection from the specific user, a second process of selecting the first in-box item with a first algorithm;

generating, by the game server in response to selection of the first in-box item, a specific supply box that corresponds to the specific player, the specific supply box including the first in-box item;

when the first process is performed and the metadata is received from the specific user:

determining, by the game server according to the metadata, that the specific supply box is to be provided within a specific distance on the game map from the designated position, wherein a plurality of coordinates are within the specific distance from the designated position, and probabilities of the specific supply box to be provided at each coordinate of the plurality of coordinates are determined based on a distance between each coordinate and the designated position; and providing, by the game server in response to the specific player entering the game map, the specific supply box at one coordinate of the plurality of coordinates according to the probabilities of the plurality of coordinates;

when either (i) the first process is performed and the metadata is not received from the specific user, or (ii) the second process is performed:

determining, by the game server, a specific location on the game map; and providing, by the game server in response to the specific player entering the game map, the specific supply box at the specific location; and allowing the specific player to use the specific supply box during the second state of the battle royale game.

2. The method of claim 1, further comprising allowing the specific player to adjust the specific distance in response to the game server detecting at least one of (i) a case where the specific player uses in-game currency, (ii) a case where the specific player uses a distance-adjusting item, and (iii) a case where the specific player completes a quest in the baffle royale game.

3. The method of claim 1, wherein when a specific avatar of the specific player is programmed to receive continuous damage after the specific avatar is positioned outside a safe area of the game map, a probability of the specific supply box being provided in a center area of the safe area is lower than a probability of the specific supply box being provided outside of the center area of the safe area.

4. The method of claim 1, further comprising when that the plurality of game players include a first player and a second player and a first supply box corresponds to the first player and a second supply box corresponds to the second player:

providing, by the game server, the first player with a first map, a first location in the first map being where the first supply box is provided; and providing the second player with a second map, a second location in the second map being where the second supply box is provided.

5. The method of claim 4, further comprising:

if in response to a first avatar of the first player being detected as having eliminated a second avatar of the second player or the first avatar being detected as having acquired a map storage owned by the second avatar, providing, by game server, the first player with the first map on which the the second location is further indicated.

6. The method of claim 4, further comprising, performing, by the game server in response to a first avatar of the first player being detected as having destroyed the second supply box, one of:

destroying a second in-box item included in the second supply box such that none of the game players are allowed to acquire the second in-box item, and allowing the first player to acquire the second in-box item.

7. The method of claim 1, further comprising allowing, by the game server in response to the battle royale game entering the second state, the specific player to acquire the first in-box item by opening the specific supply box among the supply boxes.

8. The method of claim 1, wherein the one or more personal items include at least one of (i) an item acquired by the specific player using in-game currency, (ii) an item acquired by the specific player in the second state, and (iii) an item acquired as a reward for completing a quest in the battle royale game by the specific player.

9. The method of claim 1, further comprising performing, by the game server in response to the specific player being detected as failing to open the specific supply box even after a specific time from the battle royale game entering the second state, one of:

degrading a degree of durability assigned to the specific supply box by a certain amount; and degrading a degree of performance assigned to the first in-box item by a particular amount.

10. A method for providing a battle royale game in which supply boxes are provided, wherein the battle royale game is a game in which a plurality of game players compete for survival in a game map, a first state of the battle royale game being a state in which the game players log into the battle royale game but do not play the battle royale game and a second state of the battle royale game being a state in which the game players play the battle royale game, the method comprising:

providing, by a game server when the battle royale is in the first state, a specific player of the plurality of game players with an option to select an in-box item and to provide metadata of a designated position within a game map;

performing, by the game server, the first process when the game server receives a selection from the specific user, the selection indicating at least one first in-box item among (1) one or more personal items owned by the specific player and (2) one or more shared items; or performing, by the game server when the game server does not receive the selection from the specific user, a second process of selecting the first in-box item with a first algorithm;

generating, by the game server in response to selection of the first in-box item, a specific supply box that corresponds to the specific player, the specific supply box including the first in-box item;

when the first process is performed and the metadata is received from the specific user:

determining, by the game server according to the metadata, that the specific supply box is to be provided within a specific distance on the game map from the designated position, wherein a plurality of coordinates are within the specific distance from the designated position; and providing, by the game server in response to the specific player entering the game map, the specific supply box at one coordinate of the plurality of coordinates according to the probabilities of the plurality of coordinates;

when either (i) the first process is performed and the metadata is not received from the specific user, or (ii) the second process is performed:

determining, by the game server, a specific location on the game map; and providing, by the game server in response to the specific player entering the game map, the specific supply box at the specific location;

allowing the specific player to use the specific supply box during the second state of the battle royale game;

assigning, by the game server, a probability of other game players finding the specific supply box by referring to a degree of view obstruction assigned to the specific supply box; and allowing, by the game server, the specific player to adjust the degree of the view obstruction when the game server detects at least one of (i) a case where the specific player uses in-game currency, (ii) a case where the specific player uses a view obstruction-adjusting item, and (iii) a case where the specific player completes a quest in the battle royale game.

11. A game server for providing a battle royale game in which supply boxes are provided, wherein the battle royale game is a game in which a plurality of game players compete for survival in a game map, a first state of the battle royale game being a state in which the game players log into the battle royale game but do not play the battle royale game and a second state of the battle royale game being a state in which the game players play the battle royale game, the game server comprising:

a transceiver; and a processor configured to:

provide, when the battle royale is in the first state, a specific player of the plurality of game players with an option to select an in-box item and to provide metadata of a designated position within a game map;

perform the first process when the game server receives a selection from the specific user, the selection indicating at least one first in-box item among (1) one or more personal items owned by the specific player and (2) one or more shared items; or perform, when the game server does not receive the selection from the specific user a second process of selecting the first in-box item with a first algorithm;

generate, in response to selection of the first in-box item, a specific supply box that corresponds to the specific player, the specific supply box including the first in-box item;

when the first process is performed and the metadata is received from the specific user:

determine, according to the metadata, that the specific supply box is to be provided within a specific distance on the game map from the designated position, wherein a plurality of coordinates are within the specific distance from the designated position, and probabilities of the specific supply box to be provided at each coordinate of the plurality of coordinates are determined based on a distance between each coordinate and the designated position; and provide, in response to the specific player entering the game map, the specific supply box at one coordinate of the plurality of coordinates according to the probabilities of the plurality of coordinates;

when either (i) the first process is performed and the metadata is not received from the specific user, or (ii) the second process is performed:

determine a specific location on the game map; and provide, in response to the specific player entering the game map, the specific supply box at the specific location; and allow the specific player to use the specific supply box during the second state of the battle royale game.

12. The game server of claim 11, wherein the processor is further configured to allow the specific player to adjust the specific distance in response to detection of at least one of (i) a case where the specific player uses in-game currency, (ii) a case where the specific player uses a distance-adjusting item, and (iii) a case where the specific player completes a quest in the battle royale game.

13. The game server of claim 11, wherein when a specific avatar of the specific player is programmed to receive continuous damage after the specific avatar is positioned outside a safe area of the game map, a probability of the specific supply box being provided in a center area of the safe area is lower than a probability of the specific supply box being provided outside of the center area of the safe area.

14. The game server of claim 11, wherein when the plurality of game players include a first player and a second player and a first supply box corresponds to the first player and a second supply box corresponds to the second player, the processor is further configured to:
provide the first player with a first map, a first location in the first map being where the first supply box is provided; and
provide the second player with a second map, a second location in the second map being where the second supply box is provided.

15. The game server of claim 14, wherein the processor is further configured to provide, in response to a first avatar of the first player being detected as having eliminated a second avatar of the second player or the first avatar being detected as having acquired a map storage owned by the second avatar, the first player with the first map on which the second location is further indicated.

16. The game server of claim 14, wherein the processor is further configured to perform, in response to a first avatar of the first player being detected as having destroyed the second supply box, one of:
destroy a second in-box item included in the second supply box such that none of the game players are allowed to acquire the second in-box item; and
allow the first player to acquire the second in-box item.

17. The game server of claim 11, wherein the processor is further configured to allow in response to the battle royale game entering the second state, the specific player to acquire the first in-box item by opening the specific supply box among the supply boxes.

18. The game server of claim 11, wherein the processor is further configured to:
assign a probability of other game players finding the specific supply box by referring to a degree of view obstruction assigned to the specific supply box; and
allow the specific player to adjust the degree of the view obstruction in response to detection of at least one of (i) a case where the specific player uses in-game currency, (ii) a case where the specific player uses a view obstruction-adjusting item, and (iii) a case where the specific player completes a quest in the battle royale game.

19. The game server of claim 11, wherein the one or more personal items include at least one of (i) an item acquired by the specific player using in-game currency, (ii) an item acquired by the specific player in the second state, and (iii) an item acquired as a reward for completing a quest in the battle royale game by the specific player.

20. The game server of claim 11, wherein the processor is further configured to perform, in response to the specific player being detected as failing to open the specific supply box even after a specific time from the battle royale game entering the second state, one of:
degrade a degree of durability assigned to the specific supply box by a certain amount; and
degrade a degree of performance assigned to the first in-box item by a particular amount.

* * * * *